March 26, 1946.   C. M. SAVRDA   2,397,158
RIBBING CONVEYER
Filed April 14, 1944   4 Sheets-Sheet 1
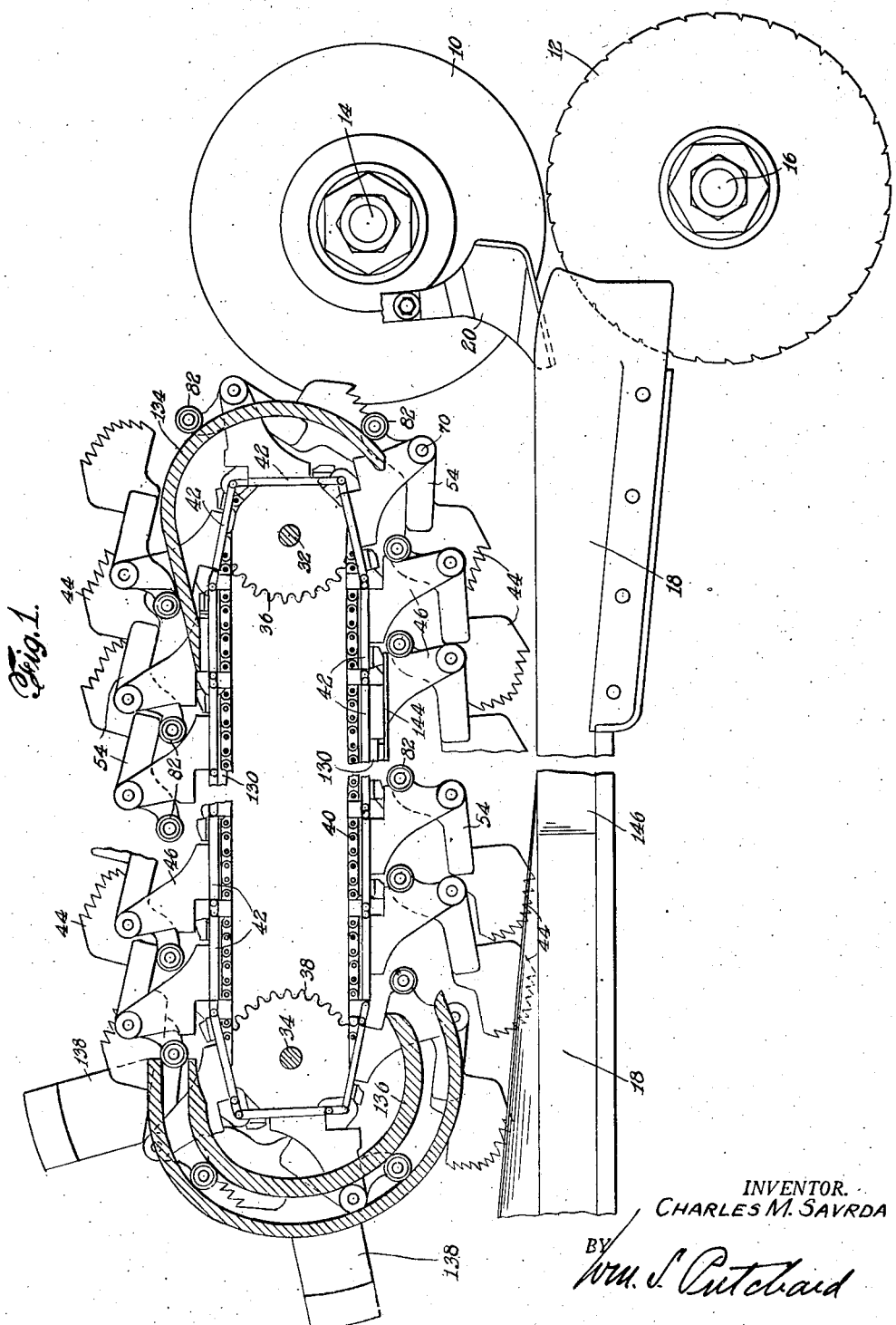
INVENTOR.
CHARLES M. SAVRDA
BY
Wm. S. Pritchard
ATTORNEY.

March 26, 1946.  C. M. SAVRDA  2,397,158
RIBBING CONVEYER
Filed April 14, 1944  4 Sheets-Sheet 2
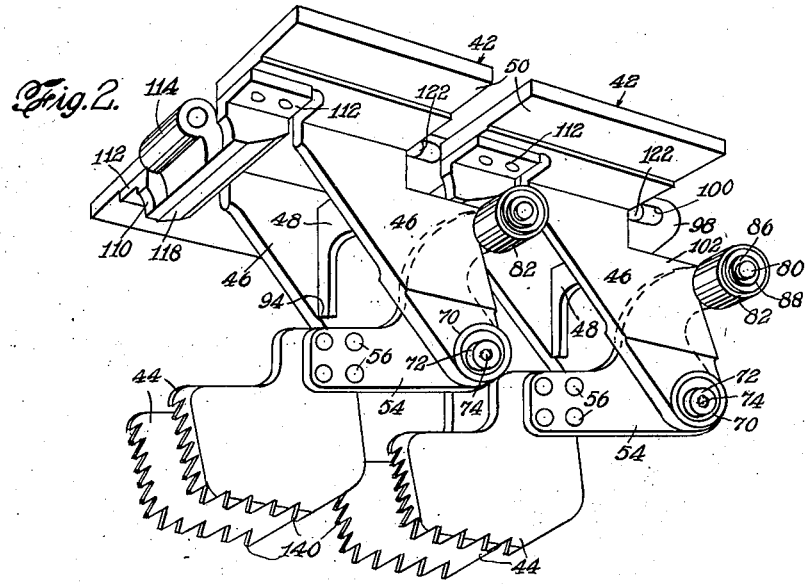
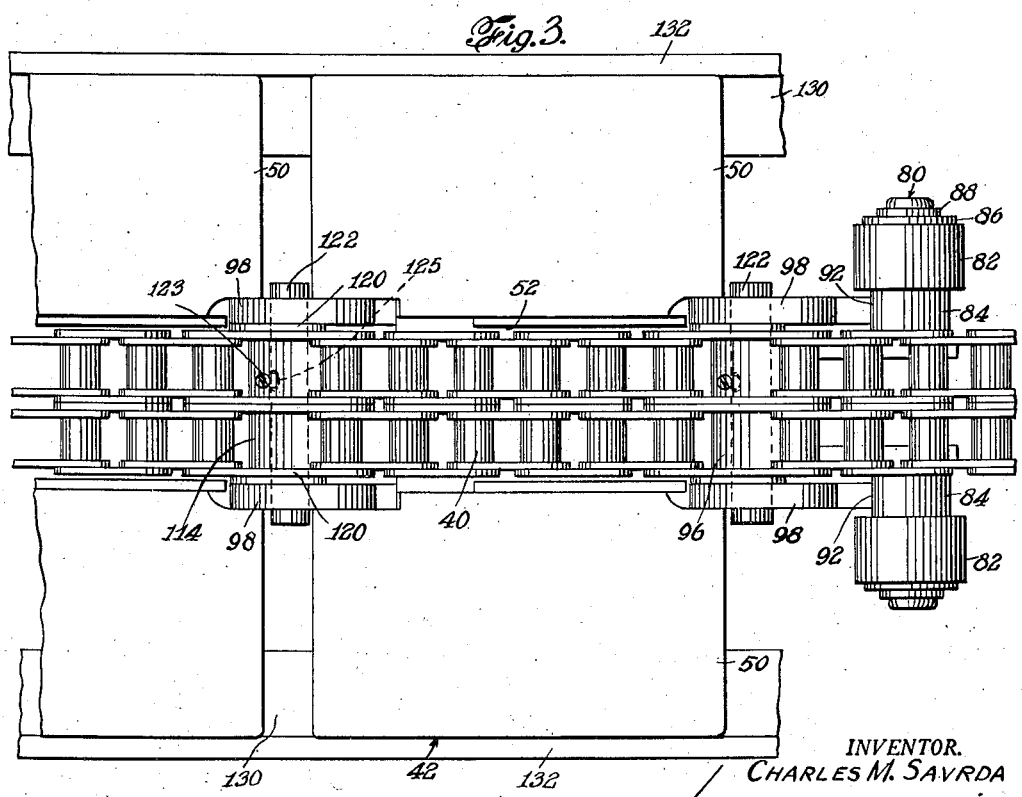
INVENTOR.
CHARLES M. SAVRDA
ATTORNEY.

March 26, 1946. C. M. SAVRDA 2,397,158
RIBBING CONVEYER
Filed April 14, 1944 4 Sheets-Sheet 3
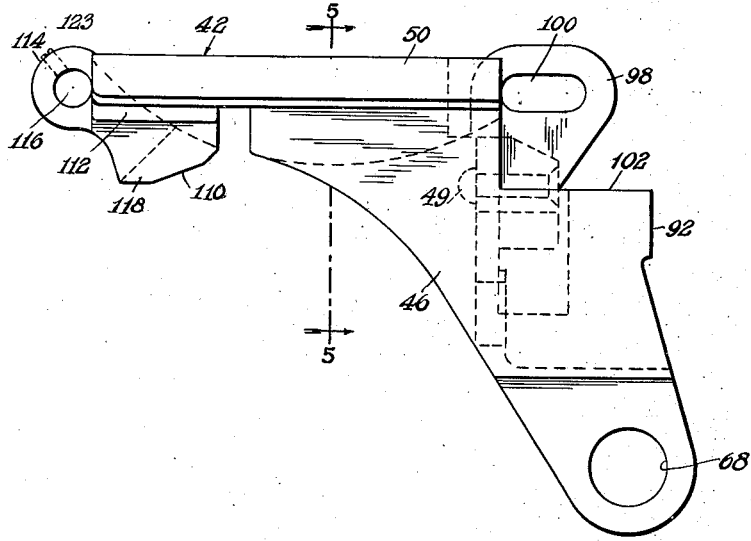
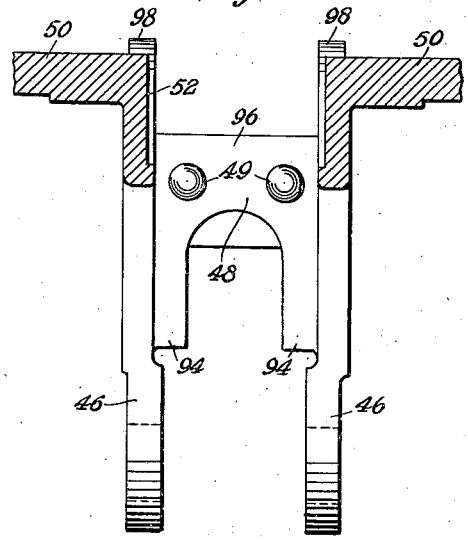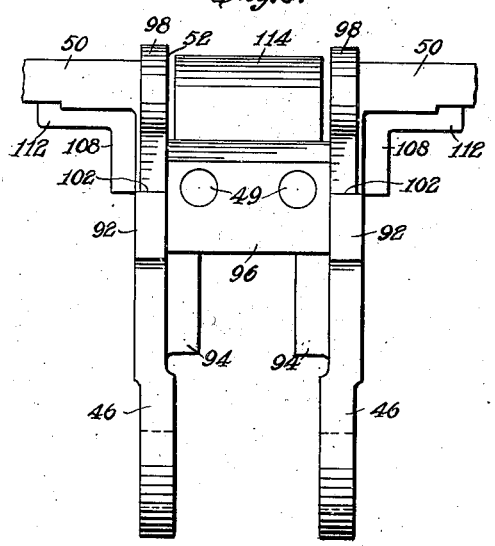
INVENTOR.
CHARLES M. SAVRDA
BY
ATTORNEY.

March 26, 1946.  C. M. SAVRDA  2,397,158
RIBBING CONVEYER
Filed April 14, 1944  4 Sheets-Sheet 4

INVENTOR.
CHARLES M. SAVRDA
BY
ATTORNEY.

Patented Mar. 26, 1946

2,397,158

UNITED STATES PATENT OFFICE 2,397,158

RIBBING CONVEYER

Charles M. Savrda, Bay Shore, N. Y., assignor to The Atlantic Coast Fisheries Company, New York, N. Y., a corporation of Maine Application April 14, 1944, Serial No. 530,967

14 Claims. (Cl. 198—170)

This invention relates to filleting machines, and more particularly to the means for conveying the fish over the ribbing knives and maintaining the fish in contact with said ribbing knives.

As described in United States Patent 2,149,021, after a fish, tail leading and back downward, has been slit through its entire length upwardly through the back thereof to the backbone and the belly slit by parallel incisions, each fillet remains attached to the backbone of the fish along its lateral sides by a small ribbon of meat. The fillets are further attached to the ribs of the fish. In this condition, the fish is propelled with sufficient force onto a pair of ribbing knives. The two ribbons of meat adhering to the backbone are severed by the severing portion of the ribbing knives so that the fillets remain attached only at the ribs of the fish. The backbone, being freed of the support supplied by the meat, tends to arc downwardly as it passes along the ribbing knives. The ribbing knives engage and scrape along each of the ribs, in spite of their angular variation, to remove the fillets therefrom.

As also shown in Patent 2,149,021, there is provided means for conveying and simultaneously holding the fish down on the ribbing knives so that the fillets can be removed from the ribs. This means, herein called a "ribbing conveyer," comprises a pair of endless chains having a series of supporting plates secured thereto in spaced relationship. Each supporting plate is secured at approximately the middle thereof to the chains and journals a lever comprising an arm, which, when carried along the lower lever of the chains, faces downwardly and rearwardly, terminating along its under side in a series of teeth. The other arm extends through the supporting plate so as to project above the chains. The levers are arranged in staggered relationship with each other and are offset laterally so that they can pass on either side of the spikes extending toward the belly of the fish from its backbone.

An object of this invention is to provide a new and novel ribbing conveyer.

Another object of this invention is to provide a ribbing conveyer utilizing one endless chain.

An addtional object of this invention is to provide a ribbing conveyer having supporting blocks secured to the endless chain in a manner to impart a minimum throw to each block when it passes around the sprockets in travelling from the upper to the lower flights and vice versa.

A further object of this invention is to provide a ribbing conveyer in which adjacent blocks, when in a horizontal plane, cooperate with each other to form a substantially rigid structure.

A still further object is to provide a ribbing conveyer in which each block is provided with two laterally spaced fingers, each of the fingers being movable independently of the other and the block.

Other and specific objects will become apparent from the following description, appended claims and accompanying drawings forming a part of this specification and wherein:

Figure 1 is a side elevation, partly in section of one embodiment of the apparatus constituting the invention;

Figure 2 is a perspective view showing two adjacent supporting plates in a horizontal plane, and also mechanisms carried by said plates;

Figure 3 is a top plan view of adjacent blocks with the chain in position;

Figure 4 is a side elevation of the block shown in Figure 3;

Figure 5 is a section taken on the line 5—5 of Figure 4;

Figure 6 is an end elevation looking toward the left of Figure 4;

Figure 7:
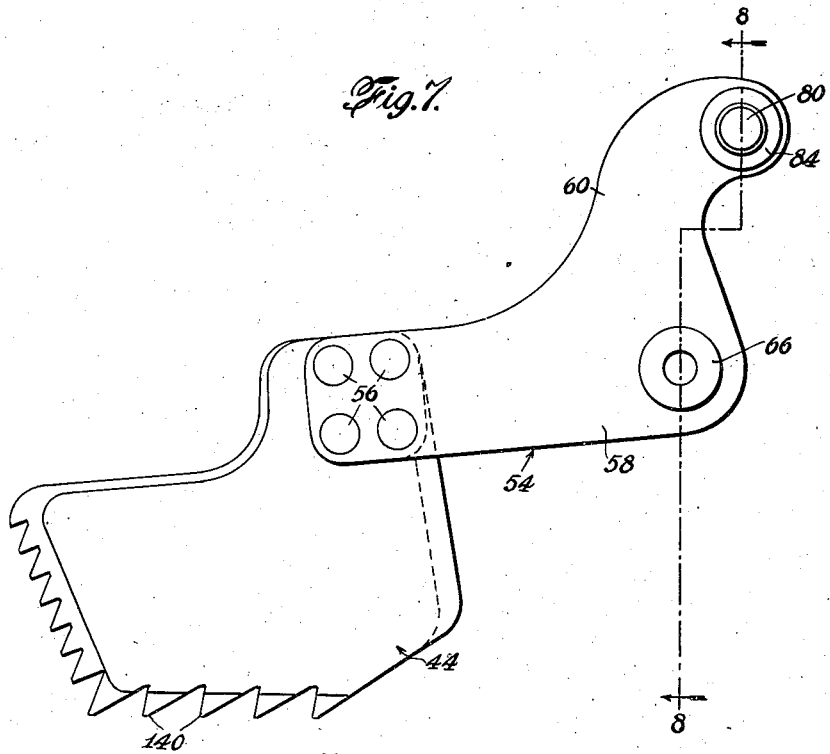
Figure 7 is a side elevation of a pusher finger and holder.

Referring now to the drawings wherein like reference numerals designate like parts, the reference numeral 10 designates one (the other not being shown) of a pair of rotary belly-cutting knives which are adapted to make parallel incisions in the belly of a fish which is fed thereto, tail leading and back downward. The fish, prior to being incised by the rotary belly knives 10, has been slit through its entire length upwardly through the back almost to the backbone by any appropriate mechanism, such as, for example, that disclosed in United States Patent 2,149,021. During the belly-slitting operation, the fish is supported by a pair of rotary guide discs 12, which engage the fish at the backbone thereof. The rotary knives 10 and rotary discs 12 are mounted on shafts 14 and 16 respectively, which are suitably carried on the frame and driven by suitable means (not shown) to provide said rotary knives 10 and rotary discs 12 with the desired peripheral speeds.

The knives 10 and the discs 12 are driven at the desired high rate of speed, whereby the fish is caused to be fed therebetween and projected onto a pair of ribbing knives 18 appropriately positioned on supports carried by the frame. A deflector 20 aids in directing and positioning the fish on the ribbing knives 18 as it leaves the rotary knives 10 and rotary discs 12. Since the details of construction of the deflector 20 and the mode of mounting and positioning it in the apparatus form no essential part of this invention, further description thereof is deemed unnecessary.

The ribbing knives 18 are preferably of the form, shape and construction shown in Figure 30 of United States Patent 2,149,021 and in United States Patent 2,179,821, although it is apparent that other ribbing knives of different shape, form and construction may be used.

Disposed above the ribbing knives 18 is a pair of spaced shafts 32 and 34, which are supported in bearings carried by the frame (not shown). The forward shaft 32 carries a sprocket 36, and the rear shaft 34 carries a sprocket 38. An endless chain 40 passes around the sprockets 36 and 38. The shaft 34 is driven in any convenient manner from a suitable source of power (not shown). Blocks, generally designated by the reference character 42, are arranged in series and are secured at spaced intervals to the chain 40, as will hereafter be described. Each block carries a pair of spaced pusher fingers, generally designated by the reference numeral 44, which are designed to engage the fish and, as the chain 40 travels, feed the fish over the ribbing knives 18.

Each block 42 comprises a pair of substantially parallel spaced, downwardly depending, supports 46 secured together by a brace 48. Each support 46 is provided at the upper end thereof with an outwardly extending flange 50. As is shown in the drawings, the two flanges 50 in each block are laterally spaced from each other to provide a longitudinal passageway 52 in which the chain 40 is disposed. For reasons which will become apparent, the flanges 50 also extend beyond the front edge of the supports 46.

Figure 8:
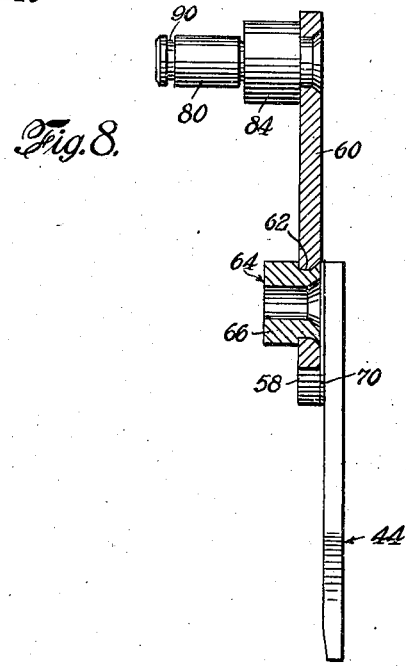
Figure 8 is a section taken on the line 8—8 of Figure 7.

As is shown in Figures 7 and 8, each pusher finger 44 is secured to a holder 54 by rivets 56. The holder 54 is in the form of a lever having a horizontal arm 58 and an upwardly curved arm 60. For reasons which will become apparent, each pusher finger holder 54 is rotatably mounted on the inner surface of the support 46. In the form shown, each holder 54 is provided with a hole 62 in which a bushing 64 is firmly secured. The bushing 64, which extends outwardly from the holder 54, is provided with an integral enlargement 66, which is rotatably positioned in a bore 68 of the support 46. A washer 70 and a nut 72, cooperating with a screw 74 extending through the bushing to beyond the outer surface of the support 46, serve to maintain the holder 54 on the support 46.

In a hole adjacent the top end of the curved arm 60 of each holder 54, there is rigidly secured one end of a stud shaft 80. This stud shaft 80 extends outwardly, and adjacent its free end there is rotatably mounted thereon a cam roller 82. An enlargement 84, constituting a collar, on the stud shaft, a washer 86, and a locking ring 88 positioned in a groove 90 in the stud, serve to maintain the cam roller 82 in position on the stud.

Due to the manner in which the pusher finger holder 54 is mounted on its support 46, it is urged by gravity to move in a downward direction when the block is in a horizontal position. When a block is travelling through the lower flight as shown in Figure 1, at which time the pusher fingers 44 are in engagement with a fish on the ribbing knives, the downward movement of the respective holders 54 is limited by a stop engaging the enlargement 84. In the form shown, a side edge 92 of the support 46 constitutes the stop. When a block is travelling through the upper flight, at which time the pusher fingers 44 are in inoperative position, the downward movement of the lever is limited by the ends 94 of the brace 48, and which is engaged by the horizontal arm 58 of the holder 54.

At the rear end of each block (at the right of Figure 2), there is provided a yoke 96 which is secured to the brace 48 in any convenient manner, as by rivets 49. Each yoke 96, which is positioned intermediate the support 46 of each block, has at each end thereof a vertical member 98 provided with a horizontal slot 100. It is to be noted that each vertical member 98 is disposed adjacent the corner of the inner edge and the rear edge of the flange 50 and is seated on a shoulder 102 of the support 46.

At the forward end of each block (looking to the left of Figure 2), there is a yoke 110 having a flange 112 at each end thereof. Each flange 112 is disposed below and is riveted to the flange 50. The yoke 110 is provided with an integral boss 114 which extends upwardly into the passage 52. The ends of the boss 114 are spaced from the edges of the flanges 50 adjacent thereto. The boss 114 extends beyond the edges of the flanges 50, and such extension is provided with a longitudinal bore 116 therethrough. The bottom 118 of the yoke 110 is adapted to cooperate with the shoulder 102 of the support 46 of the block positioned in front thereof, as will be explained.

To secure the blocks 42 on the chain 40, the vertical members 98 of one block 42 are positioned between the ends of the boss 114 of the block positioned immediately in back thereof. Depending ears 120, carried by the chain 40, are positioned intermediate the ends of the boss 114 and the vertical members 98. A pin 122, extending through the slots 100, the ears 120, and the bore 116, secures the parts together. The pin 122 is secured in place by a set screw 123 cooperating with a recess 125 in the pin and constitutes a pivot about which each of the blocks secured thereto may rotate in only one direction, for reasons which will become apparent. Each pin 122 is also slidable in the slots 100, whereby shifting of the blocks relative to the chain may be provided when it passes around the sprockets.

From the foregoing description, it becomes clear that each of the blocks 42 is pivotally mounted adjacent the ends thereof and is capable of movement in one direction about pivot pins 122 independently of the movement of the blocks immediately in front and back thereof. When the chain 40 is in a horizontal flight, the bottom 118 of the yoke engages and rests on the shoulder 102 of the supports 46 of the block immediately in front thereof. This action holds the blocks in a horizontal position and forms a substantially rigid structure, i. e. inhibits movement of the blocks relative to each other about the pivot in one direction. When the blocks are in the lower horizontal flight, as, for example, when the pusher fingers 44 are cooperating with a fish on the ribbing knives 18, the blocks 42 are locked against downward movement with respect to each other, forming a substantially rigid structure. It is, of course, apparent that the blocks may be moved upwardly about the pivot 122 when in this position. When the blocks travel through the upper flight, the blocks are prevented, by means of the locking action between the bottom 118 of the yoke 110 and the shoulder 102, from moving in an upward direction about the pivot pins 122, and thereby also form a substantially rigid structure. In this condition, the blocks are, however, not prevented from independent movement relative to each other in a downward direction about the pivot pins 122.

In order to prevent lateral shifting movement of the blocks 42 at least during the lower and upper flights, there is provided a pair of spaced, oppositely disposed, rigid guides 132, between which the flanges 50 of the blocks 42 pass and whereby lateral shifting thereof is prevented. If desired, the flanges 50 of the blocks 42 may also travel on a pair of spaced rails 130 during the lower and upper flights, whereby the substantial rigidity of the blocks during such flights is maintained. As shown in Figure 3, the rails 130 and the guides 132 may be made integral or joined together and extend longitudinally of the machine adjacent the upper and lower flights of the chain 40.

A guide member 144 is carried on the rails 130 and cooperates with the roll 82 to elevate the pusher fingers 44 and permit them to enter in the flared portion 146 of the ribbing knives 18. As shown in Figure 1, the member 144 extends from prior to the flared portion 146 to a short distance above said flared portion.

It is to be noted that due to the manner of mounting the blocks at their ends to the chain, when they pass over either of the sprocket wheels 36 or 38, there will be a minimum throw of the blocks.

To bring the fingers 44 into operative position to engage a fish passing from the belly-slitting knives, there is provided a cam 134 which is appropriately mounted on the frame of the machine (not shown) and is designed to cooperate with the cam roller 82 of the finger holders 54. This cam 134 also maintains the holders 54 in retracted position during a portion of the travel of each block over the sprocket wheel 36. Adjacent the sprocket 38, there is also provided a cam 136, which is carried on a casting 138 appropriately mounted on the frame of the machine (not shown). The cam 136 cooperates with the cam roller 82 to elevate the fingers 44 from the skeleton of the fish near the end of the ribbing knives. This cam 136 also serves to keep the fingers 44 in a retracted position as the blocks pass around the sprocket 38.

As is shown in the drawings, each pusher finger is provided with teeth 140. The shape of the pusher finger holder 54, together with the pusher fingers 44, is such that as a block leaves the sprocket 36, the cam 134 will position the holder so that the fingers 44 will be in position to engage a fish fed onto the ribbing knives 18 with a forward thrust. This forward thrust effect is present during the entire period of time the fingers are in engagement with the fish.

Though the supports 46, brace 48, and flanges 50 of each block 42 may be made of separate elements and secured together to form the frame on which the other elements are mounted, in the preferred form they are formed in a single unitary casting.

In the foregoing description, the pusher fingers 44 are described as being carried on holders 54. If desired, the pushers and holders may be made integral, in which case the portion corresponding to the holder 54 will be a curved arm.

As is apparent from the foregoing, the pusher fingers on any block are in laterally spaced relationship with respect to each other, and each is independently and pivotally mounted on the inner side of its respective support of the block frame.

In the foregoing description, certain specific means are described as stops. The invention is not restricted to such specific means since it will be apparent to a person skilled in the art that other stop means can be used.

Since it is obvious that various changes and modifications may be made in the above description without departing from the nature or spirit thereof, this invention is not restricted thereto except as set forth in the appended claims.

I claim:

1. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, means to pivotally secure each of said blocks at each end thereof to said chain, each of said blocks comprising a pair of laterally spaced downwardly extending supports providing at the top thereof a passage in which said chain is positioned, and means pivotally mounting a pusher finger on the inner surface of each of said supports.

2. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, means to pivotally secure each of said blocks at each end thereof to said chain, each of said blocks comprising a pair of laterally spaced downwardy extending supports providing at the top thereof a passage in which said chain is positioned, a pusher finger holder pivotally mounted intermediate its ends on each of said supports, and a pusher finger carried on one end of said holder.

3. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, means to pivotally secure each of said blocks at each end thereof to said chain, each of said blocks comprising a pair of laterally spaced downwardly extending supports, a pusher finger holder pivotally mounted intermediate its ends on each of said supports, a pusher finger carried on one end of said holder, and means carried by the other end of said holder adapted to engage said support to limit the downward movement of said finger during at least the period when said finger is in pushing position.

4. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, means to pivotally secure each of said blocks at each end thereof to said chain, each of said blocks comprising a pair of laterally spaced downwardly extending supports, a pusher finger holder pivotally mounted intermediate its ends on each of said supports, a pusher finger carried on one end of said holder, and means on each of said supports to engage said holder to limit the downward movement thereof during the period when said finger is in inoperative position.

5. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each of said blocks comprising a pair of laterally spaced downwardly extending supports providing at the top thereof a passage in which said chain is positioned, means mounting a pusher finger on the inner surface of each of said supports, means to pivotally secure each of said blocks at each end thereof to said chain, and cooperating means on the opposing ends of adjacent blocks to maintain said blocks horizontally and permit movement of said blocks relative to each other from said horizontal position in one direction only.

6. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each of said blocks comprising a pair of laterally spaced downwardly extending supports providing at the top thereof a passage in which said chain is positioned, means mounting a push finger on the inner surface of each of said supports, means to pivotally connect each of said blocks at each end thereof to the opposing end of an adjacent block, and means to secure each of said blocks at each end thereof to the chain.

7. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each of said blocks comprising a pair of laterally spaced downwardly extending supports providing at the top thereof a passage in which said chain is positioned, means mounting a push finger on the inner surface of each of said supports, means to pivotally connect each of said blocks at each end thereof to the opposing end of an adjacent block, means to secure each of said blocks at each end thereof to the chain, and cooperating means on the opposing ends of adjacent blocks to maintain said blocks horizontal and permit movement of said blocks relative to each other from said horizontal position in one direction only.

8. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each of said blocks comprising a pair of laterally spaced downwardly extending supports providing at the top thereof a passage in which said chain is positioned, means mounting a pusher finger on the inner surface of each of said supports, means to pivotally secure each of said blocks at each end thereof to said chain and pivotally connect the opposing ends of adjacent blocks, said means comprising a pair of spaced slotted ears carried at the rear end of each block, a journal carried at the forward end of each block and positioned intermediate said ears and a pin extending through said journal and ears, and means connecting said pin to said chain.

9. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each of said blocks comprising a pair of laterally spaced downwardly extending supports providing at the top thereof a passage in which said chain is positioned, means mounting a pusher finger on the inner surface of each of said supports, means to pivotally secure each of said blocks at each end thereof to said chain and pivotally connect the opposing ends of adjacent blocks, said means comprising a pair of spaced slotted ears carried at the rear end of each block, a journal carried at the forward end of each block and positioned intermediate said ears and a pin extending through said journal and ears, means connecting said pin to said chain, and means permitting movement of each block relative to the adjacent blocks in one direction only.

10. A conveyer to engage and feed fish over ribbing knives comprising one endless chain, a pair of spaced sprockets to direct said chain in travelling from a lower to an upper flight, means to drive one of said sprockets, a plurality of pusher finger blocks arranged in series, each block comprising a pair of laterally spaced downwardly depending supports providing a passage at the top thereof in which said chain is positioned, means mounting a pusher finger on the inner surface of each of said supports, means to pivotally connect each of said blocks at each end thereof to the opposing end of an adjacent block, and means to connect the pivotal connection to said chain.

11. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each block comprising a pair of laterally spaced downwardly depending supports providing a passage at the top thereof in which said chain is positioned, means to pivotally connect each of said blocks at each end thereof to the opposing end of an adjacent block, means on said blocks preventing relative movement between said blocks in a downward direction when said blocks are travelling through the lower flight, said means preventing relative movement between said blocks in an upward direction when said blocks are travelling through the upper flight, and means to connect the pivotal connection to said chain.

12. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each block comprising a pair of laterally spaced downwardly depending supports to provide a passage at the top thereof in which said chain is positioned, a pair of spaced slotted ears at the rear of each of said blocks, a journal at the front end of each block and positioned intermediate said ears, a pin passing through said journal and ears, means connecting said pin to said chain, each support having a shoulder at the rear thereof, and means carried at the front end of each block cooperating with said shoulder to limit the relative movement between said blocks.

13. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each block comprising a pair of laterally spaced downwardly depending supports to provide a passage at the top thereof in which said chain is positioned, a pair of spaced slotted ears at the rear of each of said blocks, a journal at the front end of each block and positioned intermediate said ears, a pin passing through said journal and ears, means connecting said pin to said chain, each support having a shoulder at the rear thereof, and means carried at the front end of each block cooperating with said shoulder to prevent relative movement between said blocks in a downward direction when said blocks are travelling through the lower flight and in an upward direction when said blocks are travelling through the upper flight.

14. A conveyer to engage and feed fish over ribbing knives comprising an endless chain, a pair of spaced sprockets to direct said chain in travelling from a lower to an upper flight, means to drive one of said sprockets, a plurality of pusher finger blocks arranged in series, each block comprising a pair of laterally spaced downwardly depending supports to provide a passage at the top thereof in which said chain is positioned, a pair of spaced slotted ears at the rear of each of said blocks, a yoke secured to the forward end of each block, a journal carried by said yoke, the journal of one block being positioned intermediate the ears of the block opposed thereto, a pin passing through said journal and ears to pivotally connect said blocks, means connecting said pin to said chain, a stop at the rear end of each block, and means on said yoke cooperating with said stop to prevent relative movement between said blocks in a downward direction when said blocks are traveling through the lower flight and in an upward direction when said blocks are travelling through the upper flight.

CHARLES M. SAVRDA.